(12) United States Patent
Courtney et al.

(10) Patent No.: US 8,762,506 B2
(45) Date of Patent: Jun. 24, 2014

(54) METHOD AND SYSTEM FOR PARTITIONING RECURSIVE NAME SERVERS

(75) Inventors: Scott Brian Courtney, Sterling, VA (US); James Fred Gould, Leesburg, VA (US)

(73) Assignee: Verisign, Inc, Reston, VA (US)

( * ) Notice: Subject to any disclaimer, the term of this patent is extended or adjusted under 35 U.S.C. 154(b) by 568 days.

(21) Appl. No.: 12/982,075

(22) Filed: Dec. 30, 2010

(65) Prior Publication Data

US 2012/0173684 A1    Jul. 5, 2012

(51) Int. Cl.
*G06F 15/177* (2006.01)
*G06F 15/173* (2006.01)

(52) U.S. Cl.
USPC .......................................... 709/222; 709/225

(58) Field of Classification Search
USPC ....................................................... 709/222
See application file for complete search history.

(56) References Cited

U.S. PATENT DOCUMENTS

| | | | |
|---|---|---|---|
| 6,961,783 B1 | 11/2005 | Cook et al. | |
| 7,472,201 B1* | 12/2008 | Aitken | 709/245 |
| 8,386,596 B2* | 2/2013 | Richardson et al. | 709/223 |
| 2007/0204040 A1 | 8/2007 | Cox | |
| 2008/0282329 A1* | 11/2008 | Shuster | 726/4 |
| 2009/0043900 A1* | 2/2009 | Barber | 709/228 |
| 2010/0146120 A1* | 6/2010 | Anipko et al. | 709/226 |
| 2011/0231892 A1* | 9/2011 | Tovar | 726/1 |
| 2011/0231893 A1* | 9/2011 | Tovar | 726/1 |
| 2011/0246634 A1* | 10/2011 | Liu et al. | 709/223 |
| 2012/0158969 A1* | 6/2012 | Dempsky et al. | 709/226 |

FOREIGN PATENT DOCUMENTS

WO    WO 01/26284 A1    4/2001

OTHER PUBLICATIONS

International Search Report and Written Opinion mailed May 7, 2012 from the International Search Authority in corresponding International Application No. PCT/US2011/067352.

* cited by examiner

*Primary Examiner* — Joshua Joo
(74) *Attorney, Agent, or Firm* — MH2 Technology Law Group LLP (57) ABSTRACT

A method of applying device preferences to network traffic includes establishing first DNS settings of a first device and establishing second DNS settings of a second device. The first DNS settings are associated with one or more first name servers. The second DNS settings are associated with one or more second name servers. The method also includes transmitting, from the first device, at least a portion of a first DNS query and a public IP address to the first name server. The method further includes transmitting, from the second device, at least a portion of a second DNS query and the public IP address to the second name server.

19 Claims, 6 Drawing Sheets

METHOD AND SYSTEM FOR PARTITIONING RECURSIVE NAME SERVERS

BACKGROUND OF THE INVENTION

The Domain Name System (DNS) is a hierarchical naming system for computers, services, or any resource participating in the internet. Using DNS, it is possible to associate various information with domain names assigned to internet participants. The analogy has been made that the DNS serves as the "phone book" for the internet by translating human-friendly computer hostnames into IP addresses.

Domain name registration is conducted under a Shared Registration System (SRS), which was created by Network Solutions, Inc. in 1999 to provide a registry through which multiple, globally diverse registrars could register domain names. The term "registry" refers to the entity responsible for managing allocation of domain names within a particular name space, such as a top level domain (TLD). VeriSign, Inc. is currently the largest registry in the world, managing millions of digital identities associated with the .com, .net, and .edu TLDs.

Name servers are operated as part of the DNS in order to translate humanly memorable domain names (e.g., www.verisign.com) and hostnames into the corresponding numeric Internet Protocol (IP) addresses. This function is also referred to as domain name resolution. Although great benefits are available through the internet, malicious software (also referred to as malware) is present on some sites and other sites attempt to acquire sensitive information such as usernames, passwords and the like by a technique known as phishing.

In order to protect users against malware and phishing sites, blacklists (also referred to as block lists) have been developed as a basic access control mechanism that allows a user to access websites except for those listed on the blacklist. Whitelists are utilized to guarantee a user access to sites that are known to be reliable. Despite the benefits provided by blacklists and whitelists, there is a need in the art for improved methods and systems for increasing the security and reliability of internet services.

SUMMARY OF THE INVENTION

The present invention relates generally to computer networks. More specifically, the present invention relates to methods for providing device and user-level filtering of network traffic. Merely by way of example, the invention has been applied to system in which DNS settings for a device are set to direct traffic to one or more of a set of predetermined name servers, which may be a single name server. The methods and techniques can be applied to a variety of computer networks and communications systems.

According to an embodiment of the present invention, a method of applying device preferences to network traffic is provided. The method includes establishing first DNS settings of a first device and establishing second DNS settings of a second device. The first DNS settings are associated with one or more first name servers. The second DNS settings are associated with one or more second name servers. The method also includes transmitting, from the first device, at least a portion of a first DNS query and a public IP address to the first name server. The method further includes transmitting, from the second device, at least a portion of a second DNS query and the public IP address to the second name server.

According to another embodiment of the present invention, a method of providing user-based DNS filtering is provided. The method includes provisioning a device to transmit DNS requests associated with a first user to a first name server. The device is associated with a source IP address. The method also includes provisioning the first name server with a policy associated with the first user. The method further includes provisioning the device to transmit DNS requests associated with a second user to a second name server and provisioning the second name server with a policy associated with the second user. Additionally, the method includes transmitting a first DNS request associated with the first user from the device to the first name server. The first DNS request is related to a first website. The method also includes receiving a first DNS response from the first name server. The first DNS response includes an IP address associated with the first website. Moreover, the method includes transmitting a second DNS request associated with the second user from the device to the second name server. The second DNS request is related to the first website. The method further includes receiving a second DNS response from the second name server. The second DNS response does not include the IP address associated with the first website.

According to an alternative embodiment of the present invention, a non-transitory computer-readable storage medium comprising a plurality of computer-readable instructions tangibly embodied on the computer-readable storage medium is provided. The plurality of instructions, when executed by a data processor, apply device preferences to network traffic. The plurality of instructions include instructions that cause the data processor to establish first DNS settings of a first device and instructions that cause the data processor to establish second DNS settings of a second device. The first DNS settings are associated with one or more first name servers and the second DNS settings are associated with one or more second name servers. The plurality of instructions also include instructions that cause the data processor to transmit, from the first device, at least a portion of a first DNS query and a public IP address to the first name server and instructions that cause the data processor to transmit, from the second device, at least a portion of a second DNS query and the public IP address to the second name server.

According to another alternative embodiment of the present invention, a non-transitory computer-readable storage medium comprising a plurality of computer-readable instructions tangibly embodied on the computer-readable storage medium is provided. The instructions, when executed by a data processor, provide user-based DNS filtering. The plurality of instructions include instructions that cause the data processor to provisioning a device to transmit DNS requests associated with a first user to a first name server and instructions that cause the data processor to provision the device to transmit DNS requests associated with a second user to a second name server. The device is associated with a source IP address. The plurality of instructions also include instructions that cause that data processor to provision the first name server with a policy associated with the first user and instructions that cause that data processor to provision the second name server with a policy associated with the second user. The plurality of instructions further include instructions that cause that data processor to transmit a first DNS request associated with the first user from the device to the first name server and instructions that cause that data processor to transmit a second DNS request associated with the second user from the device to the second name server. The first DNS request is related to a first website and the second DNS request is related to the first website. Additionally, the plurality of instructions include instructions that cause the data processor to receive a first DNS response from the first name server and receive a second DNS response from the second name server. The first DNS response includes an IP address associated with the first website and the second DNS response does not include the IP address associated with the first website.

Many benefits are achieved by way of the present invention over conventional techniques. For example, embodiments of the present invention provide a solution for per-user and per-device DNS whitelisting and black listing preferences not available using conventional systems. Other embodiments enable flexible setup of client-specific user groups and device groups. Moreover, embodiments directly address a felt need that is compliant with existing DNS standards. These and other embodiments of the invention along with many of its advantages and features are described in more detail in conjunction with the text below and attached figures.

DETAILED DESCRIPTION OF SPECIFIC EMBODIMENTS

Figure 1:
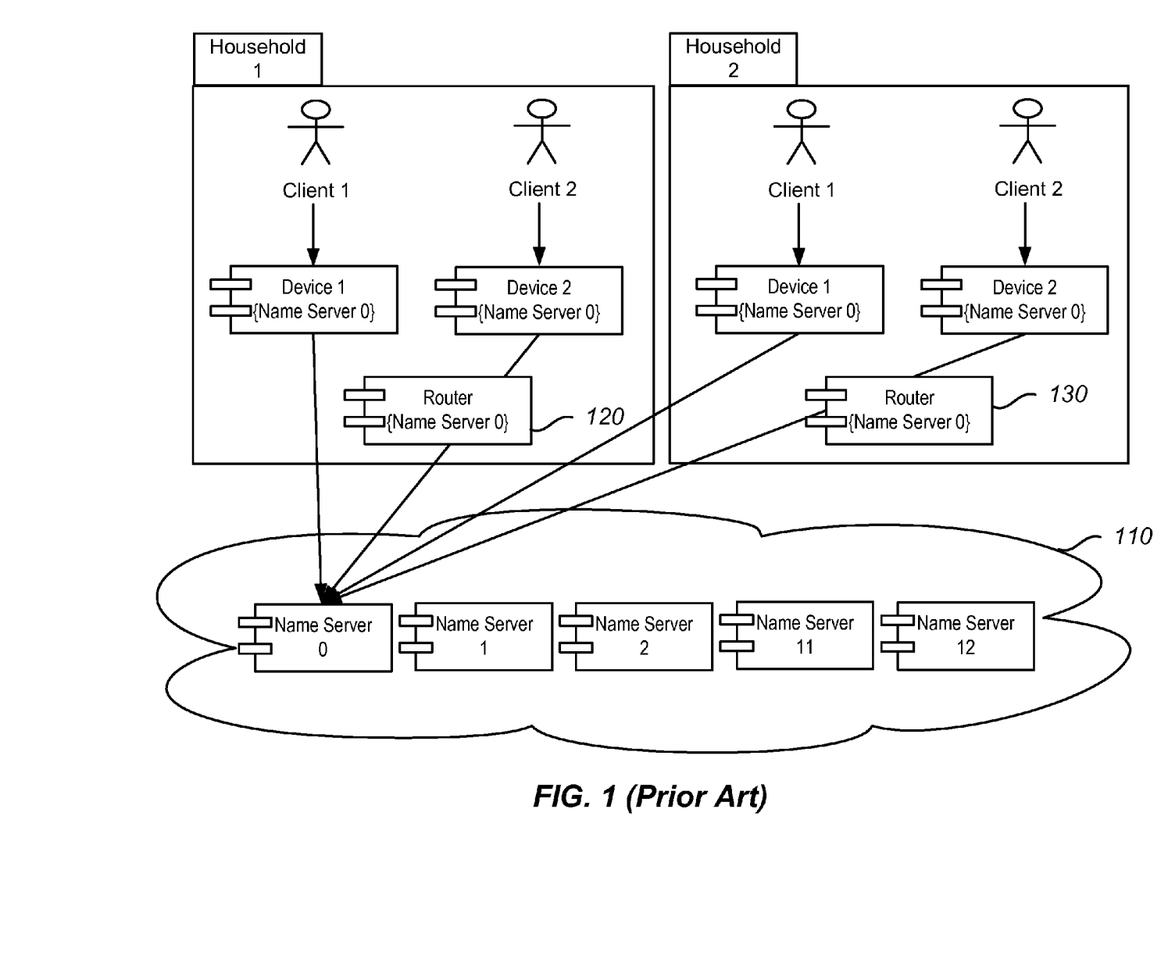
FIG. 1 is a simplified schematic diagram of a conventional network configuration.

FIG. 1 is a simplified schematic diagram of a conventional network configuration. As illustrated in FIG. 1, multiple households (Household 1 and Household 2) are provided with access to network 110, which includes a plurality of name servers (i.e., Name Server 0 through Name Server 12, of which only Name Servers 0, 1, 2, 11, and 12 are illustrated). The configuration of Router 120 in Household 1 is defined such that traffic from Device 1 and Device 2 in Household 1 is routed to Name Server 0. Similarly, the configuration of Router 130 in Household 2 is defined such that traffic from Device 1 and Device 2 in Household 1 is routed to Name Server 0.

The inventors have determined that some recursive name server services (e.g., OpenDNS) provide blacklisting and whitelisting of domains defined in terms of a household. On a household level, particular sites or categories can be blacklisted to provide for filtering of malware and sites that may be undesirable for a family. Unfortunately, such global blacklisting and whitelisting is less than optimal. Referring to FIG. 1, the global blacklisting and whitelisting provided by Name Server 0 would be applied to both Household 1 and Household 2.

Embodiments of the present invention provide for partitioning of name servers to enable blacklisting and whitelisting on a per-user and/or a per-device basis. Utilizing embodiments of the present invention, children in a home can be blocked from certain sites while parents are provided with greater access rights. Additionally, individual devices (e.g., shared computers) can be blocked from certain sites while other devices (an adult's computer) will not be blocked from one or more of these certain sites. In some embodiments, the partitioning can be user-based, as login information is utilized to set the blacklist and whitelist preferences across multiple computers.

As described more fully throughout the present specification, embodiments of the present invention provide for partitioning of the blacklist and whitelist information at the recursive name servers. As an example, Name Servers 1-10 can be associated with devices 1-10 across the households and Name Servers 11-20 can be associated with users 1-10 across the households. Thus, the household configuration can be used to specifically determine which devices and users are assigned specific preferences. Client software operating on the devices can be used to automatically set the devices name server settings to point to the desired name server based on the device configuration as well as the current user.

Utilizing embodiments of the present invention, a recursive name server operator can provide categorization with blacklists and whitelists as a value added service. The implementations described herein do not require changes to DNS itself since the resolution preferences are applied on a per device and/or a per user basis. In some embodiments, the preferences are set up based on device groups and/or user groups based to provide for ease of configuration.

Figure 2:
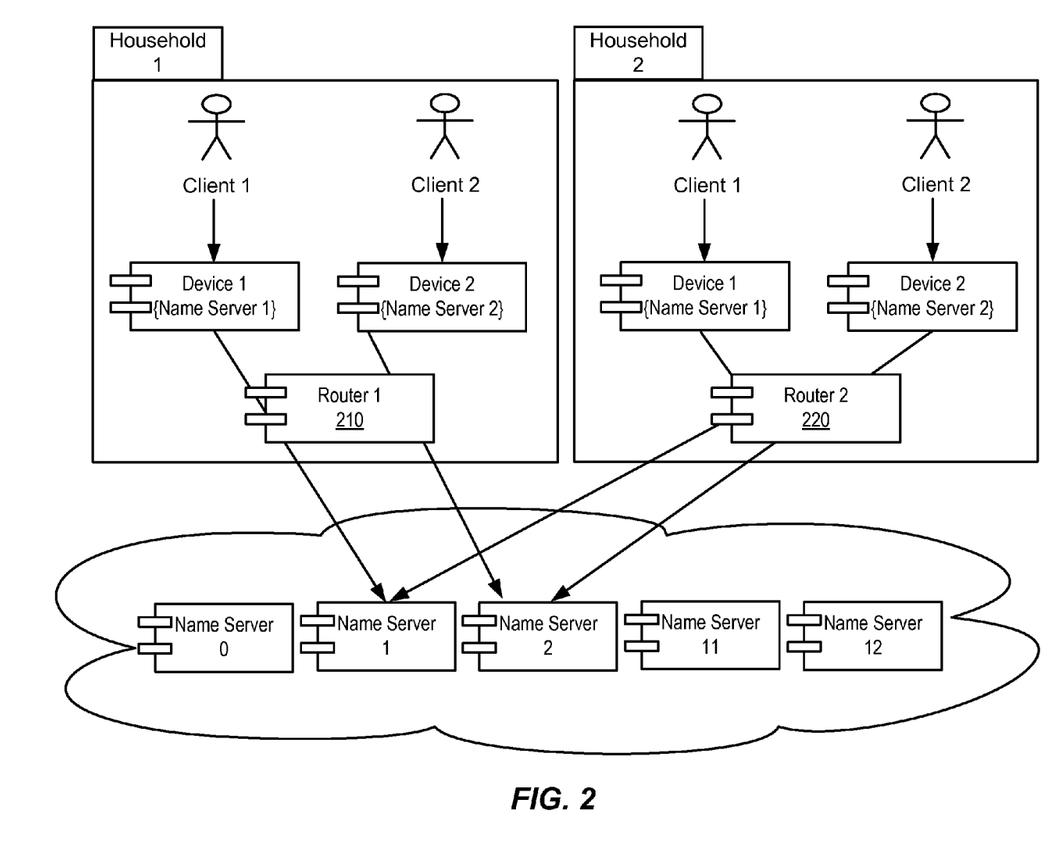
FIG. 2 is a simplified schematic diagram of a network configuration utilizing device-based partitioning of name servers according to an embodiment of the present invention.

FIG. 2 is a simplified schematic diagram of a network configuration utilizing device-based partitioning of name servers according to an embodiment of the present invention. Referring to FIG. 2, recursive Name Server 1 is configured to apply a predetermined blacklist and/or a predetermined whitelist to DNS requests based on the IP address associated with the DNS request. The blacklist can include category groupings (gambling sites, chat sites, etc.) and/or individual websites as will be evident to one of skill in the art. Devices that are configured to be routed to recursive Name Server 1 will then be provided with a filtering functionality based on the predetermined blacklist and/or whitelist. In another embodiment, the web site presents the blocked category information. In this embodiment, the web site is either partitioned with an IP address per category that scales to a small number of categories or a DNS record is included in the recursive DNS server that the web site can query (callback) to retrieve the category to display to the user.

Embodiments of the present invention provide a partitioning mode of operation that enables the implementation of customized lists of preferences for blacklisting and/or whitelisting so that devices and users can be used as the inputs to the partitioned system. As an example, an adult's computer (e.g., Device 1 in Household 1) could be configured to be routed to Name Server 1, which provides a blacklist associated with Household 1 that is appropriate for an adult. A child's computer (e.g., Device 2 in Household 1) can be configured to be routed to Name Server 2, which provides a blacklist associated with Household 1 that is different from the blacklist associated with Name Server 1 and is appropriate for a child. Thus, preferences for a first device are provided in a first partition and preferences for a second device are provided in a second partition. A provisioning tool (e.g., a web-based provisioning interface) is used to establish the policy that is applied to each device. The devices (e.g., Device 1 and Device 2) can be one of several different computing devices including desktop computers, laptop computers, notebook computers, mobile devices, PDAs, mobile phones, gaming systems, internet-capable appliances, or the like. One of ordinary skill in the art would recognize many variations, modifications, and alternatives.

The name servers include a database containing a policy for the source IP addresses associated with the various households. An example of database entries utilized by a name server is provided in Table 1.

TABLE 1

| IP Address | Blacklist | | | | | Whitelist | |
|---|---|---|---|---|---|---|---|
| | Gambling | Chat | Adware | Malware | www.xyx.com | www.verisign.com | www.yahoo.com |
| 209.111.211.106 | x | | x | x | x | x | x |
| 209.112.111.102 | | | | x | | x | x |

As illustrated in Table 1, a first IP address (209.111.211.106) is associated with a first profile that blocks sites associated with certain categories: Gambling, Adware, and Malware sites. Additionally, the www.xyz.com site is blocked. Several sites are whitelisted: www.verisign.com and www.yahoo.com. The second IP address (209.112.111.102) is associated with another profile that is different from the first profile. The illustrated categories and the blacklisted and whitelisted sites are only provided by way of example and other categories (e.g., phishing sites, etc.) as well as specific sites could be used. Additional categories and websites can be added and the categories and websites illustrated are not required by the present invention. Although only two IP addresses are illustrated in Table 1, it will be appreciated that additional profiles associated with additional IP addresses can be included in the database. One of ordinary skill in the art would recognize many variations, modifications, and alternatives. Additionally an agent can be used on the device to publish the active public IP address to the service to dynamically update the policy in the name servers.

According to an embodiment, the IP address associated with Household 1 is used as a key in the various databases utilized by the name servers to provide for filtering of the DNS queries. When a website appears on a blacklist, the user can be forwarded to another website that provides an explanation of why the website is blocked, the category in which the website is included, or the like. In an alternative embodiment, multiple IP addresses are associated with a policy when a laptop for the household is used outside the household. The DNS settings of the laptop would stay the same, but the agent on the laptop would publish the public IP of that device to the service. The publishing should not remove the protection for the non-mobile devices of the household behind the router. Thus, it is possible that there could be multiple public IP addresses associated with a group of devices and users. One of ordinary skill in the art would recognize many variations, modifications, and alternatives.

As illustrated in FIG. 2, the various name servers provide a partitioning function in order to apply different policies to different devices. In an embodiment, an agent running on the devices communicates with the device, which is connected to the network through a router in the household, to identify the name server to which traffic from the device is to be routed. As an example, Device 1 in Household 1 can include an agent that directs traffic from Device 1 to Name Server 1. The agent can also communicate with Name Server 1 to provision the policy that will be applied to Device 1. In some embodiments, the agent does not directly communicate with the name server to set the policy, but to a policy server that is preset to authenticate the agent, set the authoritative policy, and to propagate the policy out to the associated name servers. As an example, all of the name servers could contain the same policy information but manual or automatic partitioning can be used to specify the partition that the name servers should use. An alternative is for the single authoritative policy database to be partitioned with separate feeds to the partitioned name servers. The policy server could also be referenced for which name server to set on the device in order to address any repartitioning plan that is appropriate.

In a similar manner, the agent can provision a policy for Device 2 in conjunction with Name Server 2. In turn, Name Server 1 is configured to recognize the IP address published by the router or otherwise accessible to the name server, access the policy associated with the IP address, and filter the traffic based on the predetermined preferences. Thus, according to some embodiments, the combination of the public IP address associated with the device, which may be an IP address associated with the router, and the partition preferences for the particular device are utilized to filter traffic. As an example, the agent running on Device 1 (e.g., a web application, a native application, or the like) sets the DNS settings to point to Name Server 1 so that requests from Device 1 are routed to Name Server 1, which includes the blacklists and/or whitelists appropriate for Device 1.

Another agent running on Device 2 will set the DNS settings for Device 2 to point to Name Server 2 so that requests from Device 2 are routed to Name Server 2. Name Server 2 has been provisioned with a database that includes a mapping from the public IP address for Household 1 to the policy for Device 2. As an example, if Device 2 has been configured with a partition or filter that blocks malware sites, then when Name Server 2 receives a request from the router with the public IP address associated with the household including Device 2, it will filter the queries appropriately to block all malware sites. In this example, if the requested site is a malware site, then Name Server 2 will not return the IP address of that malware site, but will typically return an IP address for a website that explains that the requested site contained malware. In an embodiment, this website is operated by the entity operating the recursive name servers. Another option is for the name server to return an error (NXDOMAIN) response for a filtered domain. One of ordinary skill in the art would recognize many variations, modifications, and alternatives.

Although 13 recursive name servers are illustrated in FIG. 2, the particular number of recursive name servers is not limited to this particular number and additional or fewer name servers can be utilized in alternative embodiments. Thus, in the illustrated example, a household could define up to 13 different policies to be applied to 13 different devices in the household. As the number of recursive name servers increases, the number of profiles and devices can increase accordingly. Therefore, the number of name servers illustrated in FIG. 2 is merely an example and is not intended to limit the scope of the present invention.

According to an embodiment of the present invention, the DNS settings for the router are set by the agent running on the device in order to route requests from the particular device to a particular name server. In other embodiments, the DNS settings for the devices are set by the agent so that traffic from the device is routed to the particular name server. Thus, although devices are illustrated as connected through a router, this is not required by the present invention. The DNS settings on that device are set by the agent and the public IP address of that device is published to the service to update the filtering table of the partitioned name servers. Typically, the name servers are defined by default via DHCP. However, as described herein, the agent sets the name servers to be a predetermined name server that is appropriate for the particular partition that the device wants to implement. The public IP address, which can change over time, can be published on a regular or irregular schedule to notify the name servers of changes in the public IP address. The name server can then update its database to reflect the change in the public IP address associated with the household (e.g., the device or the router).

Thus when a name server receives a DNS request, it uses the public IP address (also referred to as a source IP address) associated with the request to access the database and retrieve the policy associated with the IP address. The term database is used in the generic sense, since this could be done in memory by the name server itself. As an example, a policy table could be created in the name server that is dynamically updated based on preference changes and based on changes in the public IP addresses for the devices and subsequently the users on the devices for user-level filtering. Thus, as illustrated in FIG. 2, the public IP address is used as an input in determining the particular policy that is applied to a device. As discussed above, the agent running on the devices can publish changes in the public IP address to the name servers through a web service in order to update the IP address over changes. Thus, filtering can be provided based on a partition/policy and IP address pair that is stored at the name server, providing different policies as appropriate to the number of partitions. Although the database storing the IP addresses and the policies is stored at the name server in some embodiments, the present invention is not limited to this implementation. In other embodiments, the database is stored remotely from the name server or is stored partially at the name server and partially remotely in a caching configuration. Depending on the embodiment, the database is stored either partially on the name server or fully stored on the name server, providing the filtering data described herein within the name server itself. In a specific embodiment, the routing information is stored fully in the name server. One of ordinary skill in the art would recognize many variations, modifications, and alternatives.

Similar to Household 1, Household 2 includes a router 220 that directs traffic associated with the devices (Device 1 and Device 2) in Household 2. Traffic from Device 1 is routed to Name Server 1 and traffic from Device 2 is routed to Name Server 2. Of course, the traffic could be routed to other name servers as appropriate to the particular application and the illustration is merely provided by way of example.

According to embodiments of the present invention, individual devices are configured with one or more name server addresses (i.e., a set of name server addresses including addresses of one or more name servers) so that traffic from the device will be directed to that set of one or more name servers for DNS resolution. The devices can be connected to the network through a router or other suitable means. Since traffic from the different devices can be directed to different sets of name servers, the policies provisioned on the name servers can be applied to the resolution services for the various devices. In an embodiment, software operating on the devices can be used to automate the processes described herein. As an example, a router implementing the functionality described herein could give our DNS settings as well the IP and DHCP settings. Thus, either through manually or automatically at the device or router level, traffic from the devices is routed to the specified name servers. In an embodiment, the public IP address and the name servers are specified for the device, in contrast with conventional systems in which routers or ISPs define these values.

In an embodiment, household IP address management (IPAM) software is used to assign different name server addresses based upon the MAC address of the various devices in the household. In these implementations, a management interface is provided that displays the pre-entered or discovered MAC address (e.g., with vendor lookup to help identify the device) and the IP address for each household device. Many home routers provide this functionality via a web interface. Through the management interface, it is possible to associate different sets of name servers to different devices. In a particular embodiment, this function is performed at the enterprise level based upon subnet address. Logic is provided to populate the name servers returned in the DHCP response based upon the configuration provided by the IPAM/DHCP module, which may also be performed at the enterprise level. Table 2 provides an example of mapping name servers based on MAC address.

TABLE 2

| MAC Address | Vendor | Description | IP Address | Name Server A | Name Server B |
| --- | --- | --- | --- | --- | --- |
| 00125a 3d9028 | Microsoft | xBox 360 | 192.168.0.7 | 1.1.1.1 | 1.1.1.101 |
| 0017ab 5a6ef6 | Nintendo | Wii | 192.168.0.8 | 1.1.1.1 | 1.1.1.101 |
| 00065b bc7ac8 | Dell | Laptop | 192.168.0.9 | 2.2.2.2 | 2.2.2.202 |

Figure 3:
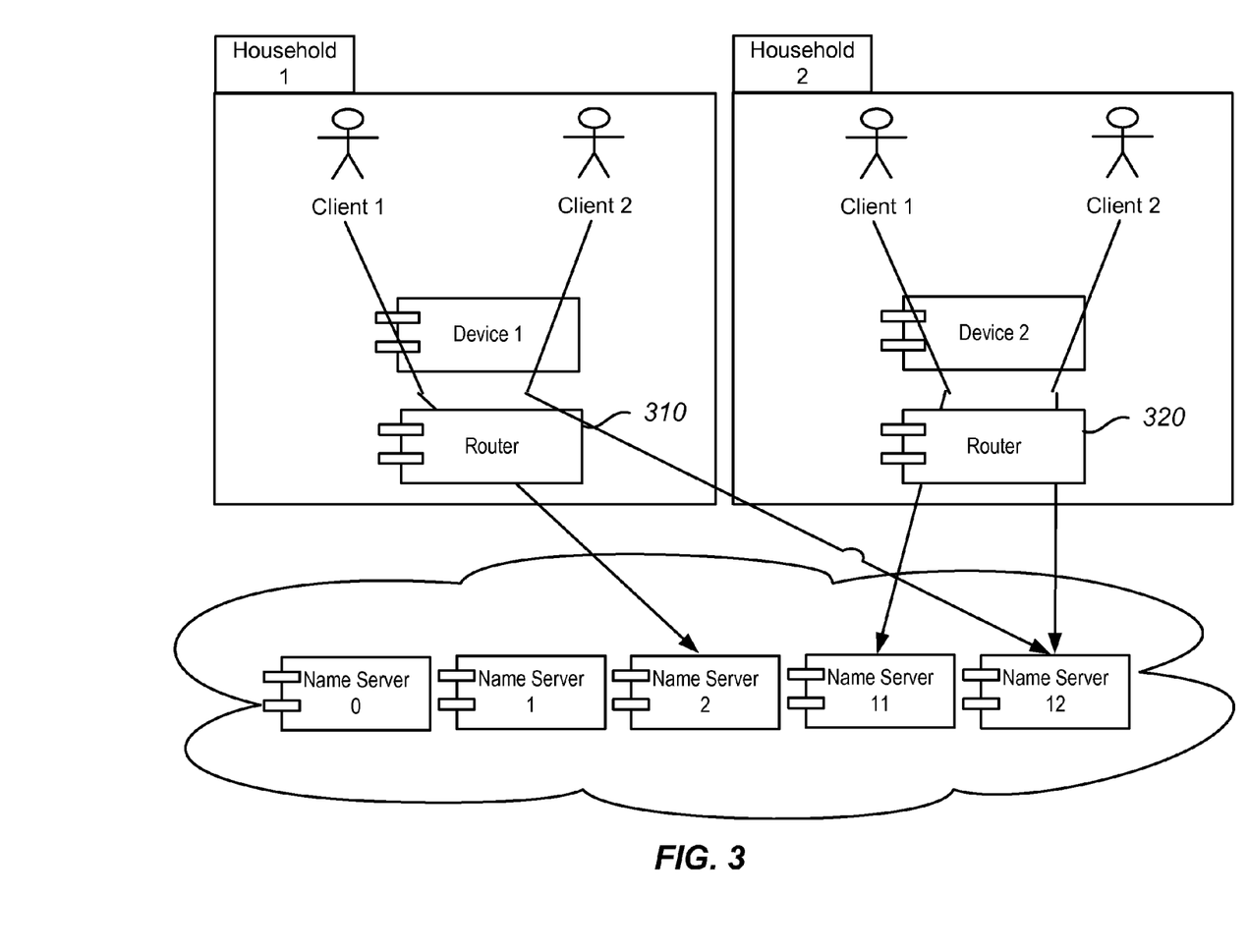
FIG. 3 is a simplified schematic diagram of a network configuration utilizing user-based partitioning of name servers according to an embodiment of the present invention.

FIG. 3 is a simplified schematic diagram of a network configuration utilizing user-based partitioning of name servers according to an embodiment of the present invention. Referring to FIG. 3, different users are able to log into a single machine (e.g., Client 1 and Client 2 in Household 1 access Device 1). As illustrated for Household 1, the name server setting for a first user (e.g., Client 1) will point to a first name server (e.g., Name Server 2). As an example, when the first user logs into the device (Device 1), an agent running on the device can update the DNS settings for Device 1 or router 310 to point to Name Server 2, which has access to a policy that has been established for the first user. In this example, the DNS settings of the device are based on the active user. When a second user logs into the device (Device 1), the agent can update the DNS settings for the device or the router 310 to point to Name Server 12, which has access to a policy that has been established for the second user. Thus, different users of a same device can be provided with different filtering protocols as appropriate to the particular user.

As discussed in relation to FIG. 2, the database associated with each name server can include IP addresses and policies associated with each IP address. Thus, the combination of the IP address and the provisioned policy are used to provide filtering on a per-use basis.

Referring to FIG. 3, a first user (Client 1) of a second device (Device 2) in Household 2 can be routed to Name Server 11 by router 320 while a second user (Client 2) can be routed to Name Server 12. When traffic is received at Name Server 12, the combination of the IP address associated with either router 310 or 320 or particular devices is used in conjunction with the provisioned policies to determine the DNS responses that are delivered to the devices (e.g., through the routers). Although households are illustrated in FIG. 3, embodiments of the present invention are not limited to households and other units are included within the scope of the present invention, including offices, floors in a building, or the like. One of ordinary skill in the art would recognize many variations, modifications, and alternatives.

Figure 4:
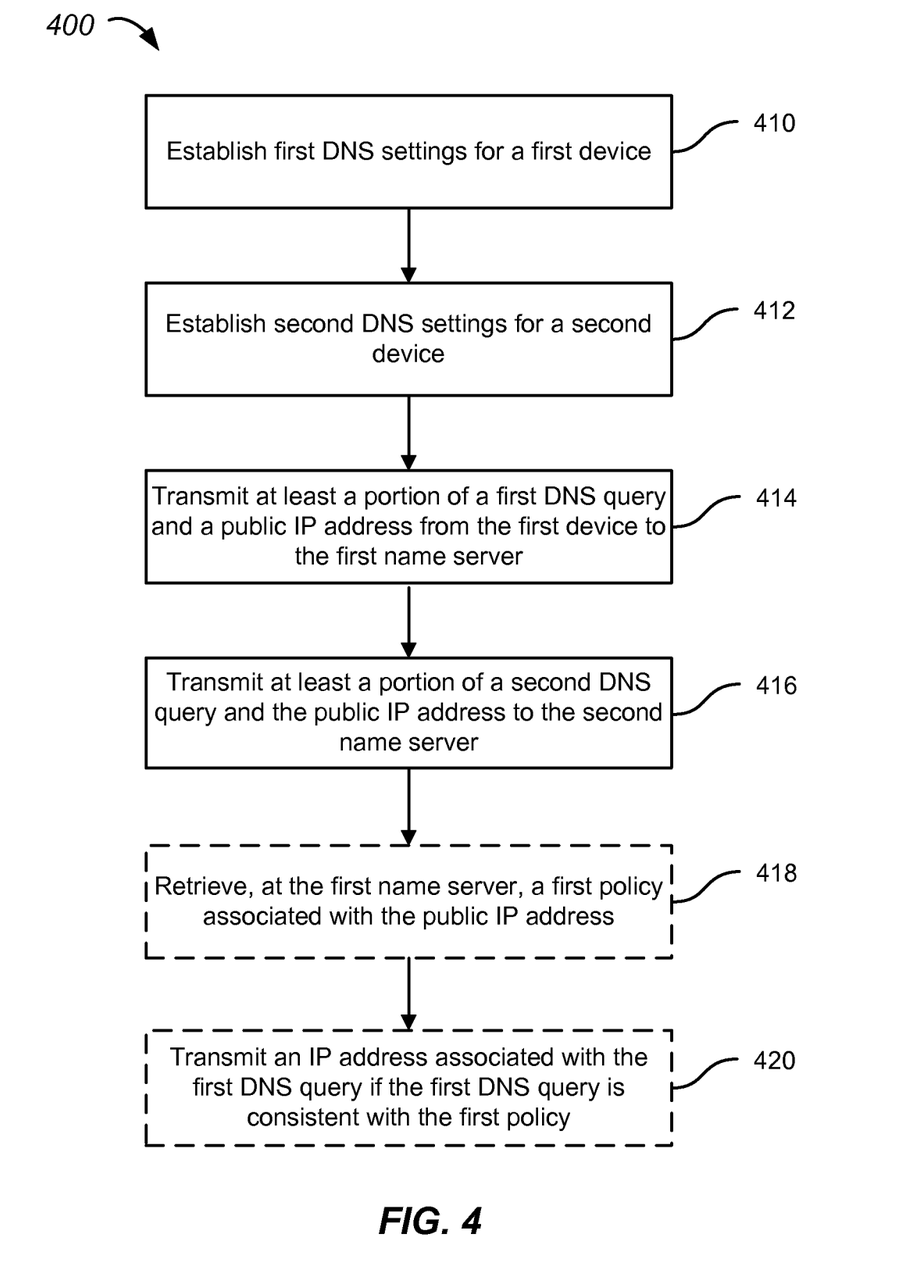
FIG. 4 is a simplified flowchart illustrating a method of partitioning name servers according to an embodiment of the present invention.

FIG. 4 is a simplified flowchart illustrating a method of partitioning name servers according to an embodiment of the present invention. The method enables the application of device preferences to network traffic. The method 400 includes establishing first DNS settings of a first device (410). As illustrated in FIG. 2, the first device can be in communication with a network through a router. The first DNS settings are associated with a first name server (e.g., a recursive name server). The first name server can be one of a first set of name servers. The method also includes establishing second DNS settings of a second device (412). The second DNS settings are associated with a second name server (e.g., a recursive name server), which can be one of a set of second name servers that are different from the set of first name servers. In an embodiment, the first device and the second device are located in a first geographic unit, for example, a household, a business, a school, or the like. In other embodiments, the devices might be geographically dispersed. In these embodiments, the policy will support multiple public IP addresses.

As described more fully throughout the present specification, in some embodiments, the DNS settings are made on the devices, but can be applied on the router itself for applying a global household policy or other suitable purpose. In some embodiments, the router is not modified to provide device and user-level filtering since the router is controlled through either DHCP or by an installer program behind the router that is operable to apply a blacklist and/or a whitelist for the entire household or to apply a global blacklist. One of ordinary skill in the art would recognize many variations, modifications, and alternatives.

The method further includes transmitting at least a portion of a first DNS query and a public IP address from the first device to the first name server (414) and transmitting at least a portion of the second DNS query and the public IP address to the second name server (416). The portion of the first DNS query can include a standard DNS query.

According to some embodiments, the method additionally includes retrieving, at the first name server, a first policy associated with the public IP address (418), determining if the first DNS query is consistent with the first policy, and transmitting a response to the first DNS query to the first device (420). The response to the first DNS query can include an IP address associated with the first DNS query. Furthermore, the method can include retrieving, at the second name server, a second policy that is associated with the public IP address and different from the first policy, determining if the second DNS query is consistent with the second policy, and transmitting a response to the second DNS query to the second device. The response to the second DNS query can include an IP address associated with the second DNS query. Typically, the response to the second DNS query will include a different IP address. It should be noted that the components performing the filtering operations described herein may or may not be recursive name servers. As an example, one embodiment is implemented using a filtering proxy in front of a real recursive name server. The filtering proxy would be responsible for applying the policy and would only forward on DNS queries to the recursive name server after filtering. Other embodiments can provide filtering as a function performed by the recursive name server.

It should be appreciated that the specific steps illustrated in FIG. 4 provide a particular method of partitioning name servers according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
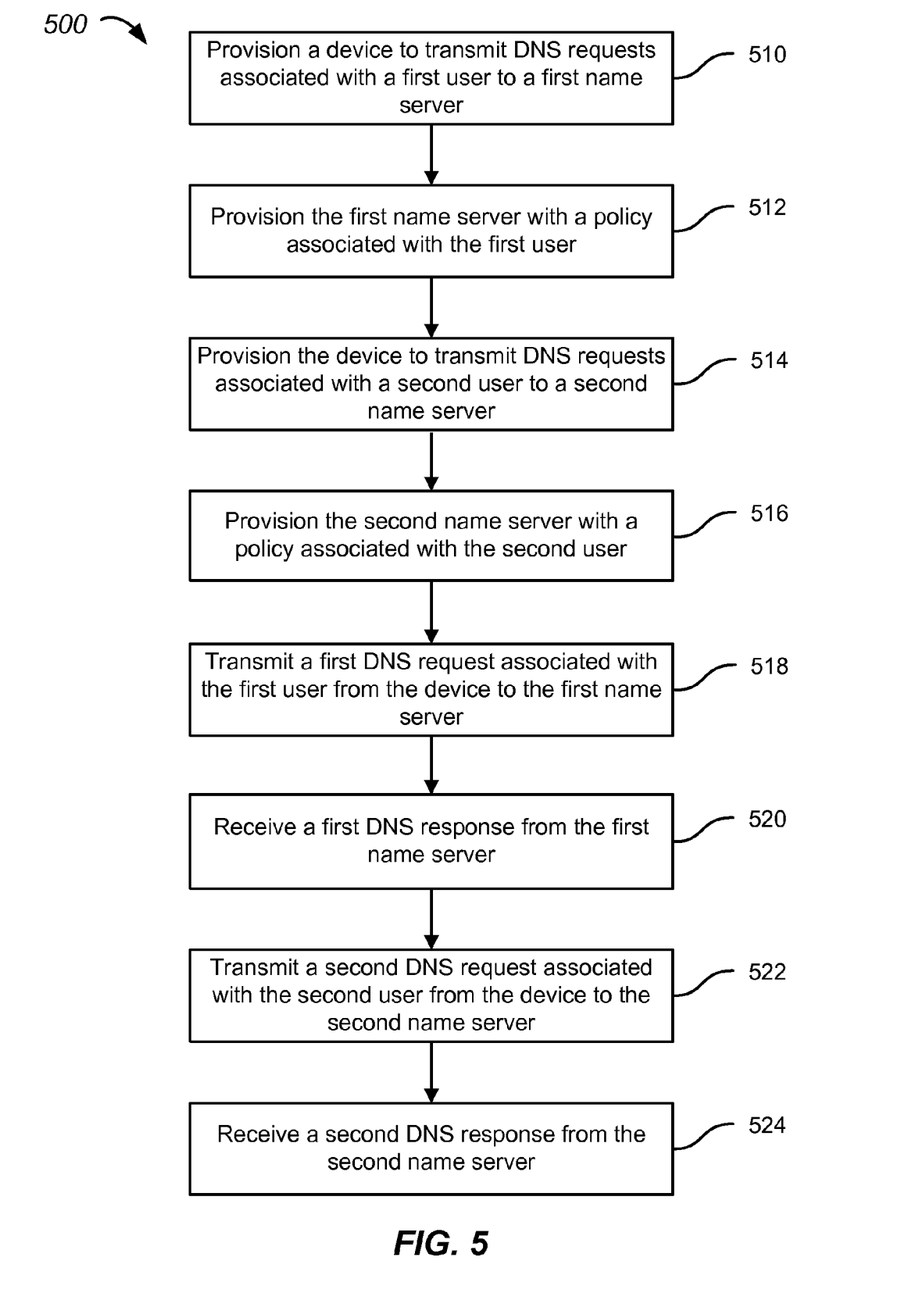
FIG. 5 is a simplified flowchart illustrating a method of providing user-based DNS filtering according to an embodiment of the present invention.

FIG. 5 is a simplified flowchart illustrating a method of providing user-based DNS filtering according to an embodiment of the present invention. The method 500 includes provisioning a router to transmit DNS requests associated with a first user to a first name server (510). The router is associated with a source IP address. The method also includes provisioning the first name server with a policy associated with the first user (512). In some embodiments, the first name server includes a database including an entry related to the source IP address and the policy associated with the first user. In some embodiments, an agent can be utilized to provide the name server as illustrated by Table 1.

The method further includes provisioning the router to transmit DNS requests associated with a second user to a second name server (514) and provisioning the second name server with a policy associated with the second user (516). As an example, the second name server can includes a database including an entry related to the source IP address and the policy associated with the second user. In a particular embodiment, the first user and the second user are associated with a single device that in communication with the router, for example, a computer, a web-enabled device, or the like. As illustrated in FIG. 3, embodiments of the present invention provide methods and systems for enabling two users in one unit to be directed to different name servers, which are, in turn, provisioned to provide different DNS results based on this provisioning.

The method also includes transmitting a first DNS request associated with the first user from the router to the first name server (518). The first DNS request is related to a first website. In the embodiments described herein, the first DNS request can include information related to the source IP address associated with the router. As an example, the first website may be a gambling website. A first DNS response is received from the first name server (520). The first DNS response includes an IP address associated with the first website. Thus, as an example, the provisioning established for the first user enables connection of the first user to the requested gambling website.

The method further includes transmitting a second DNS request associated with the second user from the router to the second name server (522). The second DNS request is also related to the first website (e.g., a gambling website). As discussed above, the second DNS request can include information related to the source IP address, for example, the source IP address of the router. Because the second DNS request is associated with a second user, and thus directed to a second name server, a different result can be provided for the second user. As illustrated in FIG. 5, a second DNS response is received from the second name server (524), but in this case, the second DNS response does not include an IP address associated with the first website. For instance, the second DNS response can include an IP address associated with information related to blocking of the first website (e.g., information related to blocking of the first website provides an indication of blacklisting of the first website). Thus, in this example, the gambling website is blocked with respect to the second user, who may be a child or the like. In some embodiments, the second DNS response includes an IP address associated with a website that provides information related to the blocking of the requested site by the user-based filtering function described herein. In an embodiment, the second DNS query and response is associated with a site that is on a blacklist. In this embodiment, an IP address for a blacklist web site is included in the response to route the user to an informational page about the blocked page or results in a non-existent domain (NXD) response in DNS. This can also be referred to as a redirect. Thus, embodiments provide systems that display category information to the end user for filtered sites. The category information can include reasons for blocking of the web site, information on groups of web sites that are blocked, or the like. For blocking at the category level, the categories blocked can be listed. For individual web sites that are blocked, feedback to the user can be provided in relation to the individual web site.

As described throughout the present specification, in some embodiments, blacklisting of websites is performed via partitioning the categories by IP addresses, where a web site would display a specific page per IP or include the category information in DNS for the blacklisting web site to query (callback) the name servers to display the appropriate information. Thus, embodiments of the present invention provide methods and systems to make DNS changes on the device based on the preference for that device or for the active user in the case of user-level DNS settings. One of ordinary skill in the art would recognize many variations, modifications, and alternatives.

It should be appreciated that the specific steps illustrated in FIG. 5 provide a particular method of providing user-based DNS filtering according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Although partitioning based on devices and users has been discussed herein, embodiments of the present invention are not limited to independent operation and combinations of device-based and user-based partitioning can be implemented. One of ordinary skill in the art would recognize many variations, modifications, and alternatives.

Figure 6:
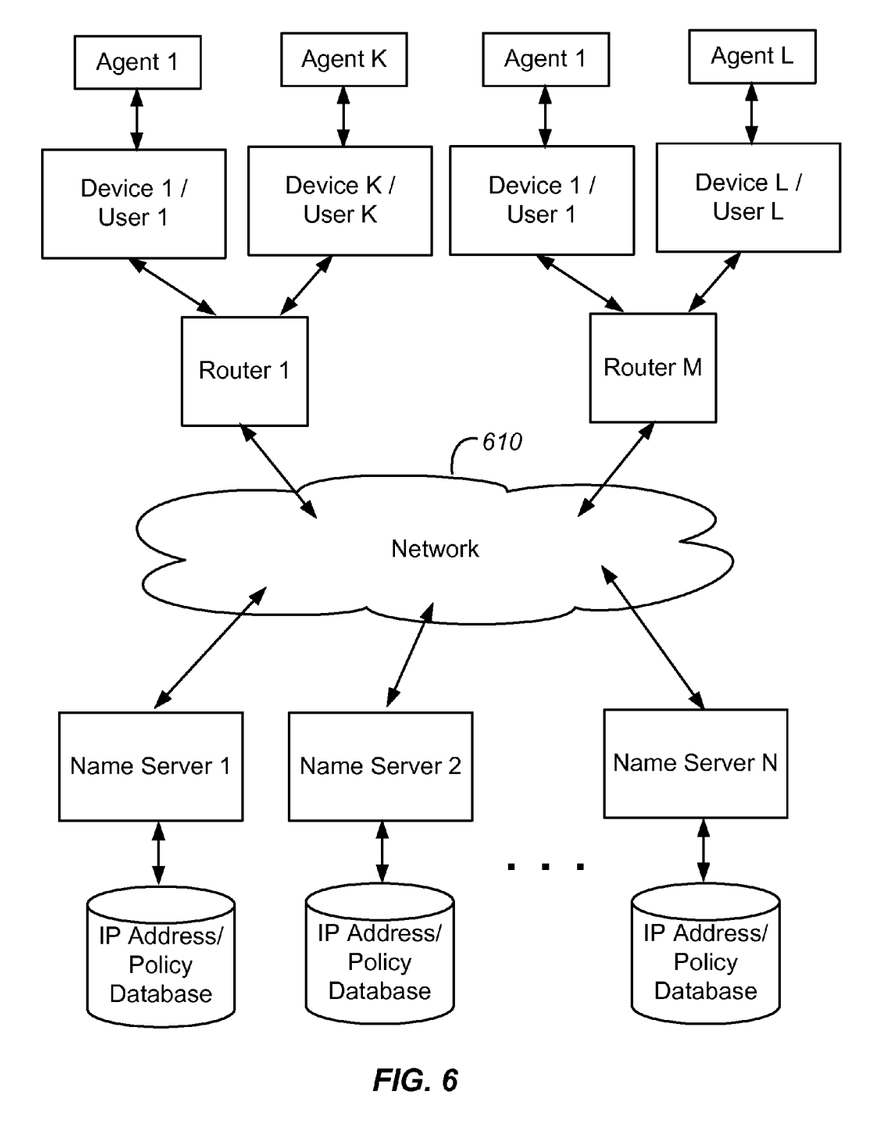
FIG. 6 is a simplified schematic diagram of a name server partitioning system according to an embodiment of the present invention.

FIG. 6 is a simplified schematic diagram of a name server partitioning system according to an embodiment of the present invention. As illustrated in FIG. 6, Agents 1-K in a first unit and Agents 1-L in a second unit communicate through network 610 with Name Servers 1-N, which are provisioned with databases including IP addresses and policies associated with those IP addresses. As an example, Router 1 can be provisioned so that Device 1 of the first unit is directed to a first name Server (e.g., Name Server 1) and Device K is directed to a second Name Server (e.g., Name Server N). Each of the name servers are provisioned with an IP Address/Policy database such that traffic that is received is filtered based on the policy established for the particular IP address, which is associated with the router. Although FIG. 6 illustrates the various devices accessing network 610 through routers, this is not required by embodiments of the present invention and the various devices can also access network 610 directly.

In addition to partitioning based on the device, partitioning can be performed based on the user. In the illustrated embodiments, multiple partitions are provided by the various name servers such that X devices and users interacting through a single router can be provided with X different policies by X different name servers. Because the router can be configured to direct traffic associated with each of the X devices/users to a predetermined one of the X different name servers, X different policies are provided for each unit in contrast with the single policy provided for each unit by conventional techniques. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of applying device preferences to network traffic, the method comprising:
receiving, at a network device, a first DNS setting for a first device, wherein the first DNS setting is associated with a first name server of a plurality of name servers, wherein the first name server comprises a first profile;
receiving, at the network device, a first DNS query from the first device;
determining, by using the network device, that the first DNS query is to be routed to the first name server based on the first DNS setting;
transmitting at least a portion of the first DNS query and a public IP address associated with the network device to the first name server;
receiving a second DNS setting for a second device, the second DNS setting being associated with a second name server of the plurality of name servers, wherein the second name server comprises a second profile associated with the public IP address, the second profile being different from the first profile, the second profile being configured to filter responses from the second name server to the network device;
receiving a second DNS query from the second device;
determining, by using the network device, that the second DNS query is to be routed to the second name server based on the second DNS setting received from the second device;
transmitting at least a portion of the second DNS query to the second name server; and
receiving a response to the second DNS query from the second name server, wherein the response to the second DNS query has been filtered by the second name server according to the second profile.

2. The method of claim 1 wherein the response to the second DNS query comprises an IP address associated with a web site providing filtering information.

3. The method of claim 1 wherein the response to the first DNS query comprises an IP address associated with a website to which the first DNS query resolves and the response to the second DNS query comprises an IP address associated with a website to which the second DNS query resolves.

4. The method of claim 1 wherein the first name server is a recursive server and the second name server is a recursive server.

5. The method of claim 1 wherein the first device and the second device are located in a first geographic unit.

6. A method of providing user-based DNS filtering, the method comprising:
receiving, at a network device, a first DNS setting for a device, the first DNS setting being associated with a first name server and associated with a first user of the device;
receiving, at the network device, a second DNS setting for the device, the second DNS setting being associated with a second name server and associated with a second user of the device;
receiving, at the network device, a first DNS request from the device, the first DNS request being associated with a first website;
determining, by using the network device, to use the first DNS setting to route the first DNS request;
transmitting at least a portion of the first DNS request and a source IP address associated with the network device to the first name server, wherein the first name server comprises a first profile associated with a public IP address associated with the network device;
receiving a first DNS response from the first name server, wherein the first DNS response includes an IP address associated with the first website;
receiving, at the network device, a second DNS request associated with the second user from the device, wherein the second DNS request is related to the first website;
determining, by using the network device, to use the second DNS setting to route the second DNS request;
transmitting at least a portion of the second DNS request and the source IP address to the second name server, wherein the second name server comprises a second profile associated with the source IP address, wherein the second profile is different from the first profile; and
receiving a second DNS response from the second name server, wherein the second DNS response does not include the IP address associated with the first website.

7. The method of claim 6 wherein the first DNS request comprises information related to the source IP address.

8. The method of claim 6 wherein the second DNS request comprises information related to the source IP address.

9. The method of claim 6 wherein the second DNS response includes an IP address associated with information related to blocking of the first website.

10. The method of claim 6 wherein the second profile includes blacklisting the first website.

11. The method of claim 6 wherein the second DNS response includes an IP address associated with an NXDOMAIN (non-existent domain).

12. A computing device, comprising:
one or more processors;
a memory system comprising one or more computer-readable media containing instructions that, when executed by the one or more processors, cause the computing device to perform operations, the operations comprising:
transmitting a first DNS setting to a network device, wherein the first DNS setting includes an association between an identifier of the computing device and a first name server of a plurality of name servers;
causing the first name server to generate a first profile associated with a source IP address associated with the network device; and
transmitting a DNS query to the network device, wherein the network device transmits the DNS query and the source IP address to the first name server based on the first DNS setting.

13. The computing device of claim 12, wherein the operations further comprise:
receiving a response from the first name server, wherein the response includes an IP address of a website to which the DNS query resolves, if providing the response including the IP address of the website is consistent with the first profile, and otherwise the response includes an IP address to another website, or an error message, or both.

14. The computing device of claim 12, wherein causing the first name server to generate the first profile comprises transmitting to the first name server a whitelist of websites, a blacklist of websites, rules for filtering based on attributes of a website, or a combination thereof.

15. The computing device of claim 12, wherein the operations further comprise:
associating the first DNS setting with a first user;
establishing a first filtering policy with the first name server of the plurality of name servers;
establishing a second filtering policy with a second name server of the plurality of name servers, wherein the second filtering policy is different from the first filtering policy;
determining that a second user is operating the computing device; and
in response to determining that the second user is operating the computing device, transmitting a second DNS setting to the network device, wherein the second DNS setting includes an association between the identifier and the second name server of the plurality of name servers, such that the network device transmits DNS queries received from the computing device to the second name server.

16. The computing device of claim 12, further comprising transmitting a second, updated source IP address to the first DNS server, wherein the first DNS server updates the first profile to associate with the second, updates source IP address.

17. The computing device of claim 12, wherein the identifier is a media access control (MAC) address associated with the computing device.

18. A method of applying device preferences to network traffic, the method comprising:
receiving, at a network device, a first DNS setting for a first device, wherein the first DNS setting is associated with a first name server of a plurality of name servers;
receiving, at the network device, a first DNS query from the first device;
determining, by using the network device, that the first DNS query is to be routed to the first name server based on the first DNS setting;
transmitting at least a portion of the first DNS query and a public IP address associated with the network device to the first name server;
receiving, at the network device, a second DNS setting from the first device, wherein the second DNS setting is associated with a second name server of the plurality of servers;

receiving, at the network device, a second DNS query from the first device;

determining, by using the network device, that the second DNS query is to be routed to the second name server based on the second DNS setting received from the first device; and transmitting at least a portion of the second DNS query and the public IP address associated with the network device to the second name server.

19. The method of claim 18, wherein the first DNS setting is associated with a first user of the first device and the second DNS setting is associated with a second user of the first device.

* * * * *